(12) United States Patent
Muljono

(10) Patent No.: US 6,347,350 B1
(45) Date of Patent: Feb. 12, 2002

(54) DRIVING THE LAST INBOUND SIGNAL ON A LINE IN A BUS WITH A TERMINATION

(75) Inventor: Harry Muljono, Union City, CA (US)

(73) Assignee: Intel Corporation, Santa Clara, CA (US)

(*) Notice: Subject to any disclaimer, the term of this patent is extended or adjusted under 35 U.S.C. 154(b) by 0 days.

(21) Appl. No.: 09/219,130

(22) Filed: Dec. 22, 1998

(51) Int. Cl.⁷ ............ G06F 13/38; H04L 12/06
(52) U.S. Cl. ............ 710/100; 710/106; 326/27; 326/30
(58) Field of Search ............ 710/32, 52, 100, 710/106, 129; 714/43, 716, 735, 750; 375/221; 709/224, 231; 370/452, 249; 713/201; 379/5; 326/30, 27

(56) References Cited

U.S. PATENT DOCUMENTS

| | | | |
|---|---|---|---|
| 4,016,541 A | 4/1977 | Delagi et al. ............ 340/172.5 |
| 4,573,154 A | * 2/1986 | Nakata et al. | |
| 4,701,841 A | 10/1987 | Goodrich et al. ............ 364/200 |
| 4,744,024 A | * 5/1988 | Potash et al. | |
| 5,153,459 A | 10/1992 | Park et al. ............ 307/452 |
| 5,247,522 A | * 9/1993 | Reiff | |
| 5,305,385 A | * 4/1994 | Schanning et al. | |
| 5,307,345 A | * 4/1994 | Lozowick et al. | |
| 5,343,503 A | 8/1994 | Goodrich ............ 375/121 |
| 5,448,591 A | 9/1995 | Goodrich ............ 375/257 |
| 5,530,377 A | 6/1996 | Walls ............ 326/30 |
| 5,578,940 A | 11/1996 | Dillion et al. ............ 326/30 |
| 5,663,661 A | 9/1997 | Dillon et al. ............ 326/30 |
| 5,767,695 A | 6/1998 | Takekuma et al. ............ 326/30 |
| 5,809,263 A | 9/1998 | Farmwald et al. ............ 395/309 |
| 5,821,767 A | 10/1998 | Osaka et al. ............ 326/30 |
| 5,822,543 A | * 10/1998 | Dunn et al. | |
| 5,831,467 A | 11/1998 | Leung et al. ............ 327/319 |
| 5,881,066 A | * 3/1999 | Lepitre | |
| 6,005,895 A | 12/1999 | Perino et al. ............ 375/288 |
| 6,078,978 A | 6/2000 | Suh ............ 710/129 |

FOREIGN PATENT DOCUMENTS

JP    51127602 A   * 11/1976

* cited by examiner

Primary Examiner—Gopal C. Ray

(57) ABSTRACT

Supporting termination on a bus. According to one embodiment of the present invention a device coupled to a line in the bus receives data from the line. The device stores the data in a storage medium and then drives the data back on the line immediately after receiving the data.

46 Claims, 7 Drawing Sheets

DRIVING THE LAST INBOUND SIGNAL ON A LINE IN A BUS WITH A TERMINATION

FIELD OF THE INVENTION

The invention relates generally to buses for processor based systems, and more particularly to supporting termination on a bus.

BACKGROUND

Computer systems include a processor, one or more memory devices, and one or more input-output or I/O devices. The processor, the memory devices, and the I/O devices communicate with each other through a bus in the computer system. A bus is a communication link comprising a set of wires or lines connected between the devices listed above. The bus is shared by the devices as they communicate with one another. A bus may also be a set of lines connected between two functional circuits in a single integrated circuit. The bus generally contains a set of control lines and a set of data lines. The control lines carry signals representing requests and acknowledgments and signals to indicate what type of data is on the data lines. The data lines carry data, complex commands, or addresses. A separate set of lines in the bus may be reserved to carry addresses, and these are called address lines. The devices communicate with each other over the bus according to a protocol that governs which devices may use the bus at any one time. The protocol is a set of rules governing communication over the bus that are implemented and enforced by a device that is appointed a bus master. Generally the processor is the bus master, although there may be more than one bus master. Each bus master initiates and controls requests to use the bus.

Two different schemes exist for organizing communication on a bus. A synchronous bus includes a clock pulse in the control lines and is governed by a protocol based on the clock pulse. An asynchronous bus does not rely on a clock pulse to organize communication. Rather, the asynchronous bus is coordinated by a handshaking protocol under which a sender communicates directly with a receiver to transfer data based on a series of mutual agreements. The sender and the receiver exchange a set of handshaking signals over the control lines before, during, and after each data transfer.

Signals are exchanged between the sender and the receiver over the bus in the following manner. The sender includes a separate driver circuit, typically including a tri-state output buffer, connected to each bus line it is to send signals to. Likewise, the receiver has a separate receiver circuit connected to each bus line it is to receive signals from. Typically the receiver circuit is a high impedance input buffer circuit such as an inverter. When the sender sends a signal on a particular line it directs the appropriate driver circuit to bring the line to a suitable voltage, either high or low. The receiver detects the signal in the appropriate receiver circuit to complete the communication. A reflection of the signal can take place if the input impedance of the receiver circuit is different from the characteristic impedance of the line. The discontinuity in the impedance causes the reflection. The signal is reflected back and forth along the line and the reflections must dissipate before a new signal can be sent on the line. This slows the operation of the bus and the computer system.

Signal reflection also causes inter-symbol interference noise (ISI) on the bus. ISI contributes to timing delay variation which limits the frequency at which a bus can transfer signals. It is therefore advantageous to reduce ISI in high frequency bus structures.

A conventional method of reducing reflection on a bus line is to damp or dissipate the reflections with a termination connected to the line. A termination is a dissipating or damping load, typically a resistive device, which has an impedance that is substantially similar to the characteristic impedance of the line. Two types of termination are used. A source termination comprises an impedance placed in a driver circuit connected to the bus line. A parallel termination comprises impedances placed in a driver circuit and a receiver circuit so that impedances are placed at both ends of a bus line. While the implementation of termination on a bus has been successful in reducing signal reflection, the implementation itself may cause problems with the operation and performance of the bus.

There remains a need for termination in high frequency bus structures and ways of supporting the termination to reduce the above-mentioned problems. For these and other reasons there is a need for the present invention.

SUMMARY OF THE INVENTION

According to one embodiment of the present invention, data is received from a line, the data is stored in a storage medium, and the data is driven back on the line immediately after the data is received. Advantages of the invention will be apparent to one skilled in the art upon an examination of the detailed description.

DETAILED DESCRIPTION

In the following detailed description of exemplary embodiments of the present invention, reference is made to the accompanying drawings which form a part hereof, and in which are shown by way of illustration specific exemplary embodiments in which the present invention may be practiced. These embodiments are described in sufficient detail to enable those skilled in the art to practice the present invention, and it is to be understood that other embodiments may be utilized and that logical, mechanical, electrical and other changes may be made without departing from the spirit or scope of the present invention. The following detailed description is, therefore, not to be taken in a limiting sense, and the scope of the present invention is defined only by the claims.

In this description transistors are described as being in an active state or switched on when they are rendered conductive by an appropriate control signal, and the transistors are described as being in an inactive state or switched off when they are rendered non-conductive by the control signal.

Figure 1:
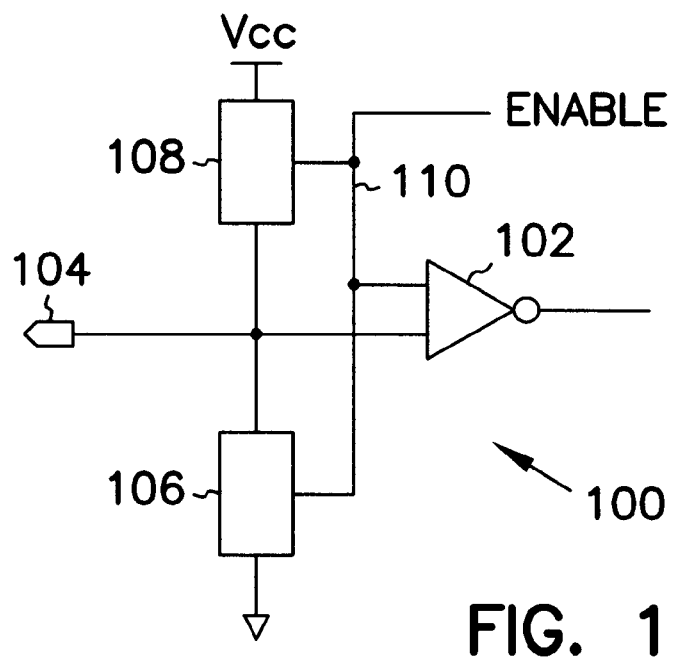
FIG. 1 is an electrical schematic diagram of a receiver circuit according to an embodiment of the present invention.

One problem with the implementation of termination is that there is a substantial dissipation of power by receiver circuits connected to a bus when the bus lines are not being driven and are left floating. This problem is described with reference to a receiver circuit 100 with a center-tapped termination circuit (CTT) shown in FIG. 1 according to an embodiment of the present invention. The receiver circuit 100 includes a high impedance input buffer circuit such as an inverter 102 for relaying a signal from a terminal 104 on a line in a bus to further circuitry. The CTT includes a first impedance device 106 connected between a ground and the terminal 104, and a second impedance device 108 connected between the terminal 104 and a supply voltage Vcc. Both the devices 106, 108 are coupled to a line 110 to receive an enable signal ENABLE that switches the devices 106, 108 on or off. When the devices 106, 108 are switched off by the ENABLE signal they are not conductive and the terminal 104 is separated from the voltage Vcc and from ground by open circuits. When the devices 106, 108 are switched on by the ENABLE signal they each have the same impedance and couple the terminal 104 midway between the voltage Vcc and ground. The devices 106, 108 are switched on by the ENABLE signal to enable the CTT when the receiver circuit 100 is monitoring the line to receive a signal. The enabled CTT substantially reduces signal reflection in the line and thereby substantially reduces ISI. The devices 106, 108 may include resistors and transistors of different types. For example, the devices 106, 108 could be comprised of N-channel transistors, P-channel transistors, BJT or JFET transistors, or a combination of one or more of the above, listed transistors, or a combination of resistors and one or more of the above-listed transistors.

Figure 2:
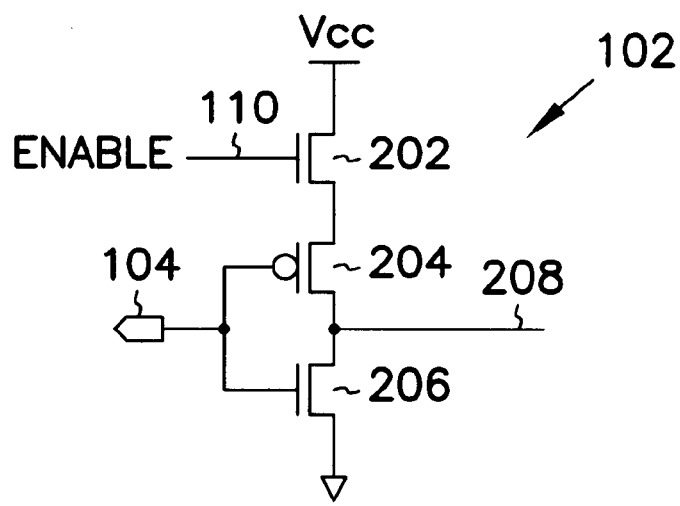
FIG. 2 is an electrical schematic diagram of an inverter according to an embodiment of the present invention.

In a bus according to an embodiment of the invention there are several receiver circuits 100 with an enabled CTT connected to and monitoring each line in the bus for signals sent from drivers that arrive unexpectedly. When a line is not being driven high or low by a driver it floats at a voltage Vcc/2 due to the enabled CTT's such as the CTT described above including the devices 106, 108. When the line is allowed to float at the voltage Vcc/2 the inverter 102 in each receiver circuit 100 connected to the line is left in an indeterminate state and dissipates a substantial amount of power. The indeterminate state is described with reference to an electrical schematic diagram of the inverter 102 shown in FIG. 2 according to an embodiment of the present invention. The inverter 102 includes an enable transistor 202 having a control terminal coupled to the line 110 to receive the ENABLE signal, a high-side P-channel transistor 204, and a low-side N-channel transistor 206. The transistors 202, 204, 206 are connected between the voltage Vcc and ground. Control terminals of the transistors 204, 206 are connected together to the terminal 104 to receive a signal on the line. When the inverter 102 is enabled by the ENABLE signal and the signal at the terminal 104 is either high or low, one of the transistors 204, 206 is switched on and the other is switched off to invert the signal. However, if the line is floating at the voltage Vcc/2 both of the transistors 204, 206 are rendered conductive such that current, called crowbar current, flows through the enabled transistor 202 and the transistors 204, 206 to dissipate power. At least some embodiments of the present invention described herein address this problem. The present invention also provides solutions to other problems not mentioned herein.

Figure 3:
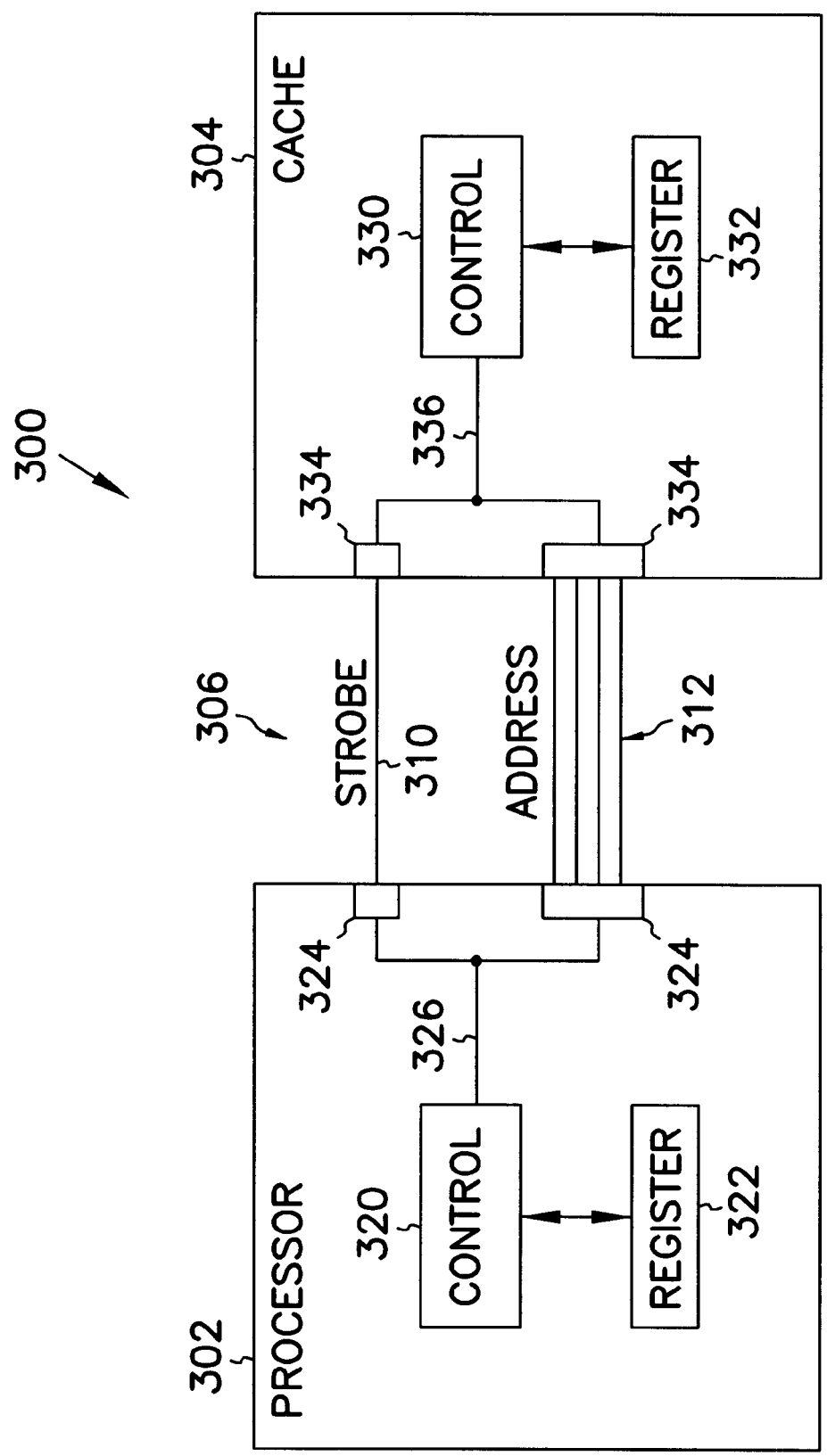
FIG. 3 is a block diagram of a system according to an embodiment of the present invention.

The present invention is described in the context of two devices communicating with each other over a bus system. A block diagram of a system 300 according to an embodiment of the present invention is shown in FIG. 3. The system 300 includes a processor 302 and a cache memory 304 connected together by a bus 306. The bus 306 includes a strobe line 310 and a set of address lines 312. The processor includes control circuitry 320 connected to a register 322 for controlling a set of combined driver/receiver circuits 324, each driver/receiver circuit 324 being connected to one of the lines 310, 312 in the bus 306. Each driver/receiver circuit 324 is connected to a set of lines 326 to exchange signals with the control circuitry 320. The cache memory 304 also includes control circuitry 330 connected to a register 332 for controlling a set of combined driver/receiver circuits 334, each driver/receiver circuit 334 being connected to one of the lines 310, 312 in the bus 306. Each driver/receiver circuit 334 is connected to a set of lines 336 to exchange signals with the control circuitry 330.

Figure 4:
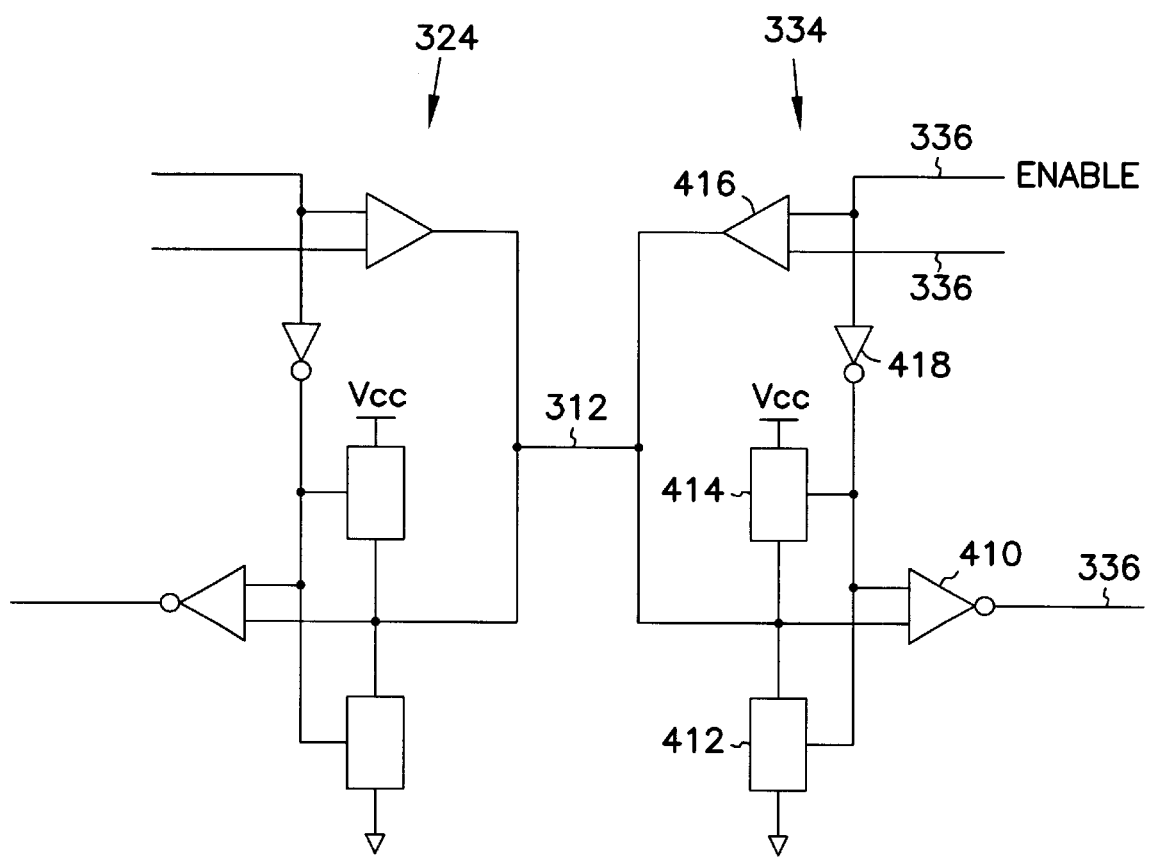
FIG. 4 is an electrical schematic diagram of a matching pair of driver/receiver circuits according to an embodiment of the present invention.

An electrical schematic diagram of a matching pair of driver/receiver circuits 324, 334 connected to communicate over one of the lines 312 according to an embodiment of the present invention are shown in FIG. 4. The elements in the driver/receiver circuits 324, 334 are similar and operate in a similar manner, and therefore only the devices in the driver/receiver circuit 334 are described with reference characters for purposes of brevity. The driver/receiver circuit 334 includes a high-impedance receiver 410 such as an inverter for receiving and relaying a signal from the line 312 to the control circuitry 330 on one of the lines 336. The driver/receiver circuit 334 includes a CTT with a first impedance device 412 connected between a ground and the line 312, and a second impedance device 414 connected between the line 312 and a supply voltage Vcc. A driver 416 is connected to drive the line 312 with a signal provided by the control circuitry 330 on one of the lines 336. The receiver 410, the CTT, and the driver 416 are coupled to one of the lines 336 to receive an enable signal ENABLE that enables or disables the driver 416 and is inverted by an inverter 418 to enable or disable the CTT and the receiver 410. At the appropriate time the control circuitry 330 provides the ENABLE signal to enable the driver 416 and disable the CTT and the receiver 410 to drive a signal on to the line 312. When the driver/receiver circuit 334 is about to receive a signal from the line 312 the control circuitry 330 changes the ENABLE signal to disable the driver 416 and enable the CTT and the receiver 410, and the receiver 410 relays the signal to the control circuitry 330 while the enabled CTT substantially reduces signal reflection on the line 312.

The processor 302 and the cache memory 304 are controlled by their respective control circuitry 320, 330 to exchange addresses over the address lines H312 under a protocol according to an embodiment of the present invention. For purposes of brevity the protocol is described with respect to a single address line 312 and the strobe line 310, although one skilled in the art having the benefit of this description will understand that the protocol is applicable to one or more of the address lines 312 and, in alternative embodiments of the invention, to one or more of a group of data lines and a group of control lines in the bus 306. The processor 302 is appointed the bus master under the protocol. The processor 302 drives address signals on to the bus 306 when no other device is driving address signals on to the bus 306. The processor 302 enables its driver and disables its CTT and receiver to drive a signal, high or low, on the line 312. The cache memory 304 disables its driver and enables its CTT and receiver to monitor the line 312 for the signal from the processor 302 that may arrive unexpectedly. The processor 302 may send a series of signals on the line 312.

Figure 5A:
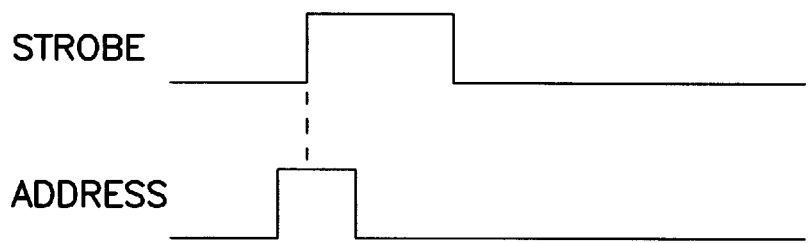
FIG. 5A–5D are timing diagrams each having a strobe signal and a companion address signal according to alternative embodiments of the present invention.

The cache memory 304 captures the signals with a strobe signal and stores the last inbound signal in the register 332. One skilled in the art having the benefit of this description will recognize that the last inbound signal may be stored in any other storage medium such as a memory, or in a dedicated circuit such as a sequential circuit such as a flip-flop circuit with an asynchronous set and reset. The processor 302 then requests an address from the cache memory 304 and disables its driver while enabling its CTT and receiver to prepare to receive the address. The cache memory 304, in response to the request, disables its CTT and receiver and enables its driver, and immediately begins driving the last inbound signal stored in the register 332 back on to the line 312. This is done to substantially reduce the possibility of bus contention if the processor 302 has not yet disabled its driver. In other words, the processor 302 may still be driving the last signal when the cache memory 304 has enabled its driver, and if the cache memory 304 starts by driving the new address there may be contention on the line 312. Under the protocol the cache memory 304 drives the last inbound signal on to the line 312 for a few clock cycles, and then drives a strobe signal, a square wave signal, on the strobe line 310, and a new address signal on the line 312 such that the processor 302 latches the new address signal on a leading edge of the strobe signal. A timing diagram of the strobe signal is shown in FIG. 5A with a leading edge coincident with the new address signal. The processor 302 enables its CTT and receiver in time to receive the new address signal because it has knowledge of the protocol and therefore knows when the strobe signal is going to arrive. The cache memory 304 drives an address signal onto the line 312 and thereafter disables its driver and enables its CTT and receiver. The processor 302 stores the new address signal in the register 322 and then disables its CTT and receiver, enables its driver, and immediately begins to drive the new address signal back on to the line 312 to substantially reduce the possibility of bus contention while the cache memory 304 is disabling its driver. In this way the protocol provides for bus master overlaps so that two drivers are driving the line 312 at the same time when one of the drivers is being disabled and the other is being enabled. The line is driven at a voltage, either high or low, to substantially reduce crowbar current and power dissipation. The two drivers drive the line 312 with the same signal to substantially reduce the possibility of bus contention.

Figure 5B:
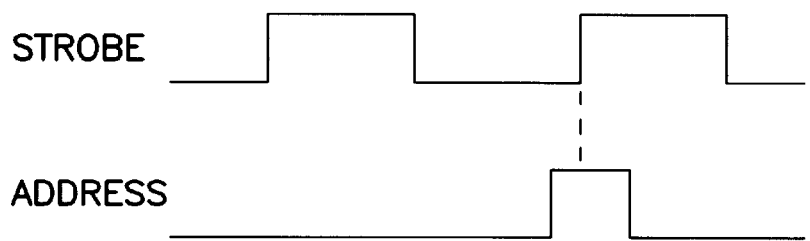
Figure 5C:
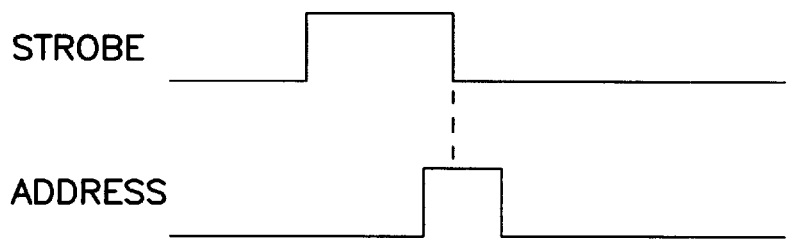
Figure 5D:
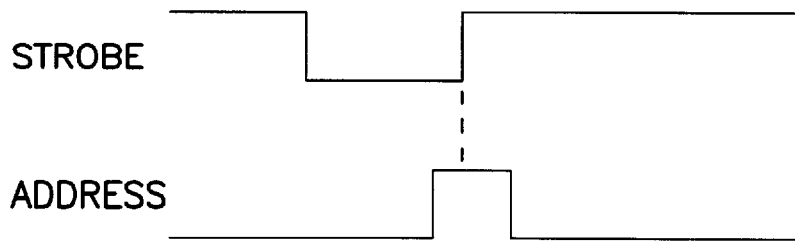

Alternative protocols according to embodiments of the present invention are described with reference to FIGS. 5B–5D, each of which show a timing diagram of a strobe signal and a companion address signal. With reference first to FIG. 5B, a protocol may be designed such that after being requested to send an address to the processor 302 the cache memory 304 sends a strobe signal with two pulses to the processor 302. In response the processor 302 disables its driver on the rising edge of the first pulse, enables its CTT and receiver on the trailing edge of the first pulse, and latches the address signal on a rising edge of the second pulse. The processor 302 may then immediately drive the address signal back on to the line 312. An alternate protocol may be designed such that the cache memory 304 sends a strobe signal with a single pulse to the processor 302, and the processor 302 disables its driver and enables its CTT and receiver on the rising edge of the pulse and latches the new address signal on the falling edge of the pulse. The processor 302 may then immediately drive the new address signal back on to the line 312. A timing diagram of a strobe signal and an address signal are shown in FIG. 5C according to this protocol. Another protocol may be designed with active-low logic according to a timing diagram of a strobe signal and an address signal shown in FIG. 5D. One skilled in the art having the benefit of this description will recognize that a protocol may be designed according to an embodiment of the present invention in which the above listed events take place on any combination of selected edges of a strobe signal.

Figure 6:
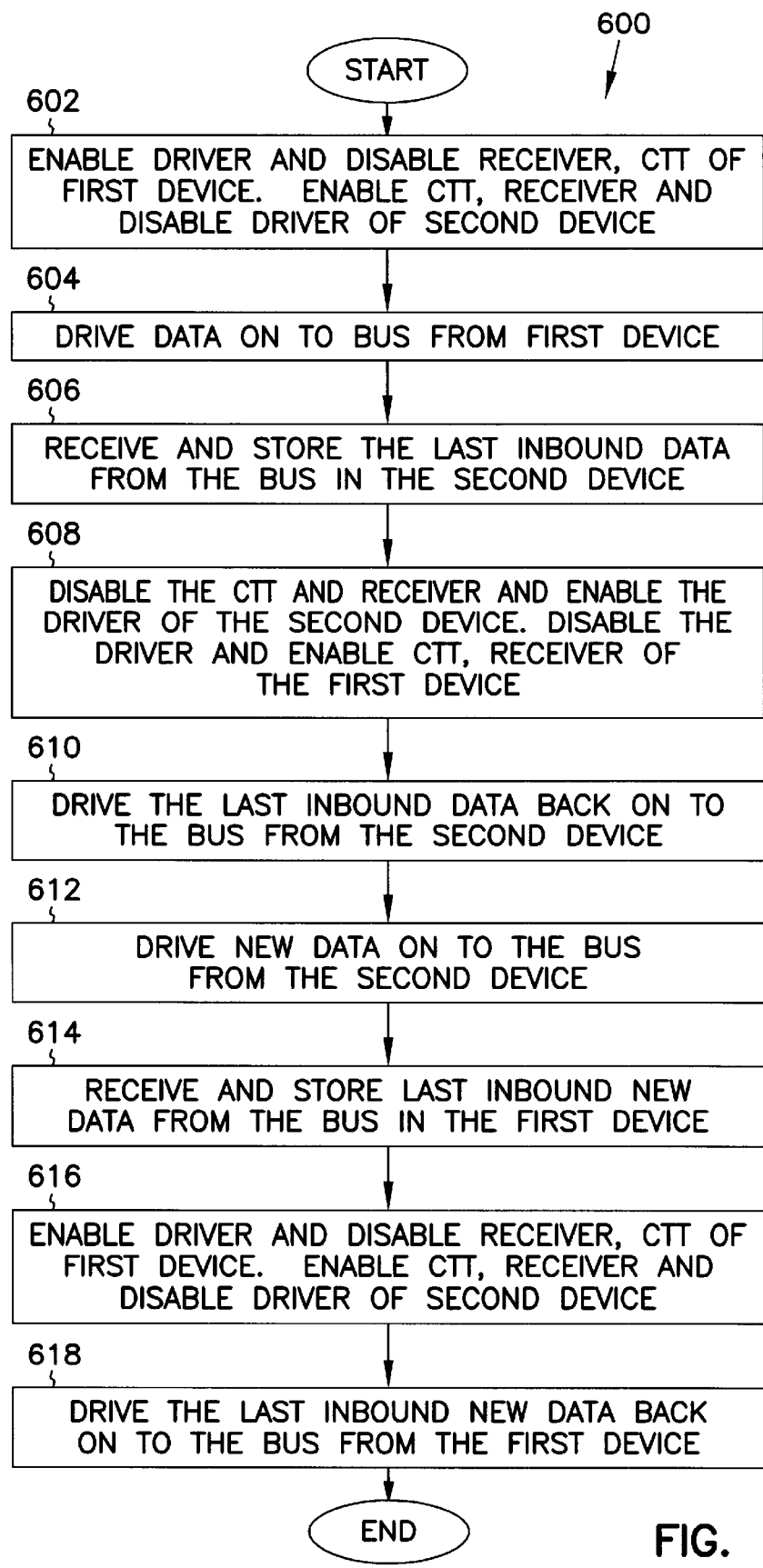
FIG. 6 is a flowchart of a method according to an embodiment of the present invention.

A flowchart of a method 600 for transferring data between a first device and a second device over a bus according to an embodiment of the present invention is shown in FIG. 6. In 602 a driver is enabled and a CTT and a receiver are disabled in the first device. Also, a CTT and a receiver are enabled and a driver is disabled in a second device. In 604 the first device drives data on to the bus. In 606 the last inbound data from the bus is received and stored in the second device. In 608 the CTT and the receiver of the second device are disabled and the driver in the second device is enabled. Also, the driver of the first device is disabled and the CTT and the receiver are enabled in the first device. In 610 the last inbound data that was stored in 606 is driven back on to the bus from the second device. The second device then drives new data on to the bus in 612. In 614 the last inbound new data is received and stored by the first device. In 616 the driver is enabled and the CTT and the receiver are disabled in the first device, and the CTT and the receiver are enabled and the driver is disabled in the second device. In 618 the last inbound new data that was stored in 614 is driven back on to the bus from the first device, and the method ends. Those skilled in the art having the benefit of this description will understand that to continue the communication between the first and second devices the method returns to 602. According to the method 600, each time data is driven on to the bus the data may be driven in a sequence of more than one bit of data. If this occurs, then the last bit driven on to the bus is stored as the last inbound data by the receiving device. The method 600 provides for driving data on to the bus to substantially reduce the time the bus is floating, and to substantially reduce the possibility of bus contention by controlling each device to start driving the last inbound data back on to the bus. One skilled in the art having the benefit of this description will understand that the steps of the method 600 may be repeated to provide for communication between more than two devices over the bus.

One skilled in the art having the benefit of this description will understand that the method 600 may be carried out for each line in a bus between the first and second devices, and for additional devices connected to the bus. The method 600 may be modified according to any of the embodiments of the invention described above, and may be implemented in many different ways. For example, the method 600 may be implemented including strobe signals sent concurrently with the data according to the strobe signals shown in FIGS. 5A–5D. The method 600 may be implemented for data lines, address lines, control lines, or any combination thereof. The method 600 may also be implemented as a series of programmable instructions stored and implemented in the respective control circuitry 320, 330 of the processor 302 and the cache memory 304. All of the embodiments of the present invention described, including the method 600, may be implemented with alternative types of circuitry or hardware including one or more of the following: hardwired logic, a Field Programmable Gate Array (FPGA), a hardwired FPGA, programmable logic, a programmable microcontroller, an Application Specific Integrated Circuit (ASIC), a Read Only Memory (ROM), or a sequencer, or any suitable combination thereof.

Figure 7:
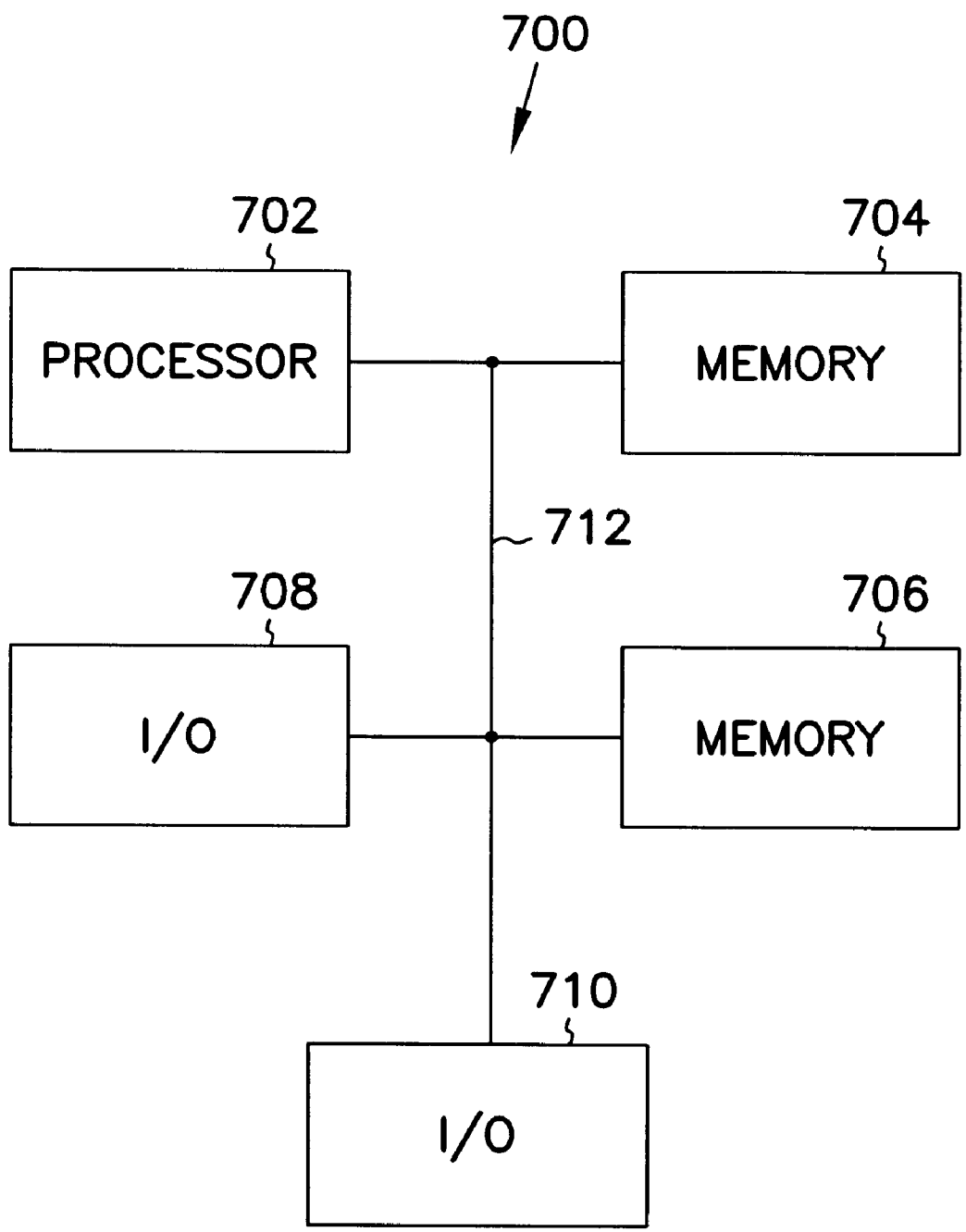
FIG. 7 is a block diagram of a computer system according to an embodiment of the present invention.

The embodiments of the invention described above may be implemented in a computer system such as a computer system 700 according to an embodiment of the present invention and shown in a block diagram in FIG. 7. The computer system 700 includes a processor 702, two memory devices 704, 706, and two input/output (I/O) devices 708, 710. Each of the memory devices 704, 706 is either a random-access memory (RAM), a read-only memory (ROM), a cache memory, or a storage device such as a hard disk drive, a floppy disk drive, an optical disk drive, or a tape cartridge drive. Each of the I/O devices 708, 710 is either a monitor, a pointing device such as a mouse, a keyboard, or a modem. The devices in the computer system 700 including the processor 702, the two memory devices 704, 706, and the two I/O devices 708, 710 communicate with each other through a bus 712 connected to the devices. Signals are sent on the bus 712 as needed by one or more of the devices, and arrive at other devices under a protocol according to one of the embodiments of the present invention described above. Each of the devices connected to the bus has a CTT, a receiver, and a driver for each line in the bus that are controlled by control circuitry as described above. Data may be driven on to the bus to substantially reduce the time the bus is floating and each device may begin driving the last inbound data to substantially reduce the possibility of bus contention. One skilled in the art having the benefit of this description will recognize that more devices such as processors, memory circuits, and I/O devices may be connected to the bus 712.

Those skilled in the art having the benefit of this description can appreciate that the present invention may be practiced with any computerized system including a bus. Such computerized systems may include, for example, a video game, a handheld calculator, a personal computer, or a multi-processor supercomputer, or an information appliance such as, for example, a cellular telephone, a pager, or a daily planner or organizer, or an information component such as, for example, a magnetic disk drive or telecommunications modem, or other appliance such as, for example, a hearing aid, washing machine or microwave oven having an electronic controller.

Figure 8:
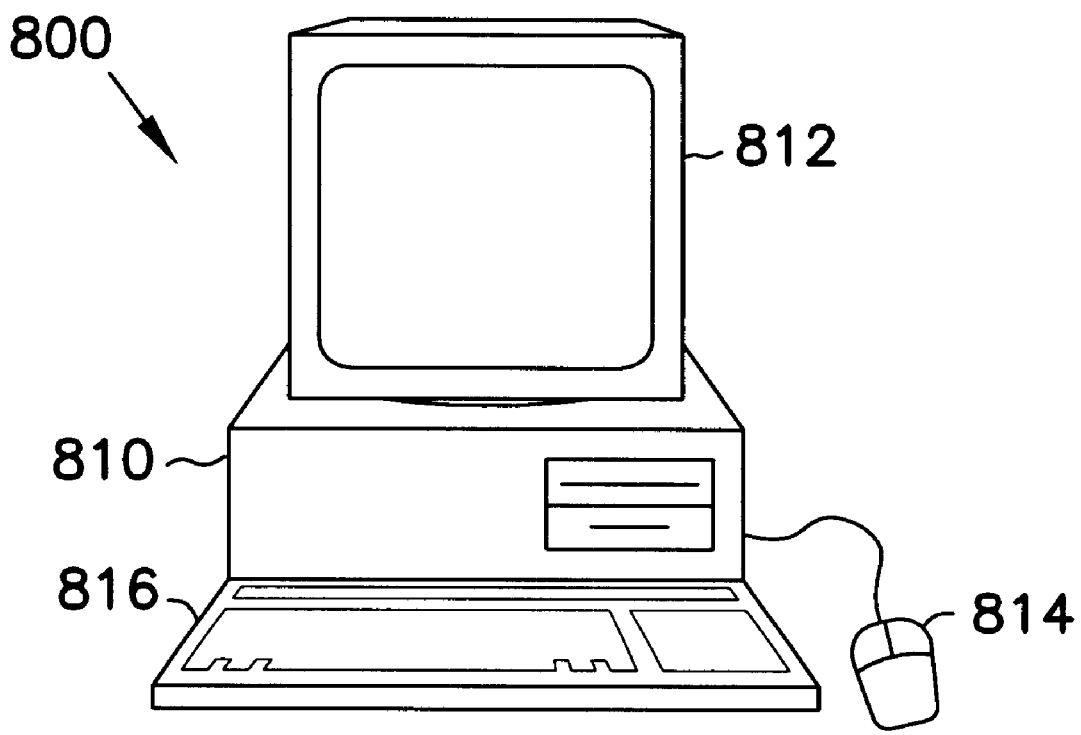
FIG. 8 is a block diagram of a personal computer according to an embodiment of the present invention.

The computer system 700 shown in FIG. 7 may take the form of a personal computer 800 shown in FIG. 8. The personal computer 800 includes a computer 810 that is operatively coupled to a monitor 812, a pointing device 814, and a keyboard 816. The computer 810 includes a processor, a random-access memory (RAM), a read-only memory (ROM), and one or more storage devices, such as a hard disk drive, a floppy disk drive (into which a floppy disk can be inserted), an optical disk drive, and a tape cartridge drive. The memory, hard drives, floppy disks, etc., are types of computer-readable media. The present invention is not particularly limited to one type of computer 810. The monitor 812 permits the display of information within a viewing area, including computer, video and other information, for viewing by a user of the personal computer 800. The present invention is not limited to any particular monitor 812, and the monitor 812 is one type of display device that may be used in a system with the present invention. Such monitors include cathode ray tube (CRT) displays, as well as flat panel displays such as liquid crystal displays (LCD's). The pointing device 814 permits a control of the screen pointer provided by graphical user interfaces. The present invention is not limited to any particular pointing device 814. Such pointing devices include mouses, touch pads, trackballs, wheels, remote controls and point sticks. Finally, the keyboard 816 permits entry of textual information into the computer 810, as known within the art having the benefit of this description, and the present invention is not limited to any particular type of keyboard.

Although specific embodiments have been illustrated and described herein, it will be appreciated by those skilled in the art having the benefit of this description that any equivalent arrangement may be substituted for the specific embodiments shown. For example, the embodiments of the invention may be applied to data lines, control lines, or address lines in a bus, or any combination thereof. The present invention is therefore limited only by the claims and equivalents thereof.

What is claimed is:

1. A method comprising:
   receiving data from a line, the data comprising a series of signals ending with a last inbound signal;
   storing the last inbound signal in a storage medium; and
   driving the last inbound signal on the line immediately after receiving the last inbound signal.

2. The method of claim 1, further comprising driving new data on the line after driving the last inbound signal on the line.

3. The method of claim 2, further comprising:
   enabling a termination circuit and a receiver coupled to the line before receiving the data;
   disabling the termination circuit and the receiver after receiving the data; and
   enabling a driver to drive the last inbound signal on the line immediately after receiving the last inbound signal.

4. The method of claim 3 wherein:
   enabling a termination circuit comprises enabling a plurality of center-tapped termination circuits and a plurality of receivers for a plurality of address lines in a bus, each receiver comprising a buffer;
   receiving data comprises receiving a plurality of inbound addresses from the address lines;
   storing the last inbound signal comprises storing a last inbound address in a register as a stored address;
   disabling the termination circuit comprises disabling the termination circuits and the receivers;
   enabling a driver comprises enabling a plurality of drivers for the address lines in the bus;
   driving the last inbound signal comprises driving the stored address back on the address lines; and
   driving new data comprises driving a new address on the address lines.

5. A method for operating a system comprising:
   receiving first data from a line in a first circuit, the first data comprising a series of signals ending with a last inbound signal;
   storing the last inbound signal in a storage medium in the first circuit;
   driving the last inbound signal on the line from the first circuit immediately after receiving the last inbound signal; and
   driving second data on the line from the first circuit to a second circuit after driving the last inbound signal on the line.

6. The method of claim 5, further comprising:
   disabling a termination circuit and a receiver in the first circuit and enabling a driver in the first circuit before driving the last inbound signal on the line; and
   disabling a driver and enabling a termination circuit and a receiver in the second circuit before driving the second data on the line.

7. The method of claim 6, further comprising:
   receiving the second data from the line in the second circuit;

storing the second data in a storage medium in the second circuit;

disabling the termination circuit and the receiver in the second circuit and enabling the driver in the second circuit;

driving the second data back on the line from the second circuit immediately after receiving the second data; and disabling the driver and enabling the termination circuit and the receiver in the first circuit.

8. The method of claim 7 wherein:

receiving first data comprises:
    disabling the driver and enabling the termination circuit and the receiver in the first circuit; and
    receiving a plurality of inbound first data signals from a plurality of data lines in a bus;

storing the last inbound signal comprises storing last inbound first data signals for the data lines in a register in the first circuit;

driving the last inbound signal on the line comprises driving the last inbound first data signals back on to the data lines;

driving second data on the line comprises:
    driving a strobe signal on a strobe line from the first circuit to the second circuit; and
    driving a plurality of second data signals on to the data lines from the first circuit to the second circuit;

receiving the second data in the second circuit comprises latching the second data signals in the second circuit on an edge of the strobe signal; and storing the second data comprises storing last inbound second data signals for the data lines in a register in the second circuit.

9. The method of claim 8 wherein:

receiving a plurality of inbound first data signals comprises receiving a plurality of inbound first address signals from a plurality of address lines in a bus;

driving a strobe signal comprises driving a strobe signal on the strobe line having a plurality of edges from a cache memory to a processor; and disabling a driver and enabling a termination circuit and a receiver in the second circuit comprises disabling the driver and enabling the termination circuit and the receiver in the processor on an edge of the strobe signal before latching the second data signals in the processor.

10. The method of claim 7 wherein:

receiving first data comprises:
    receiving a first strobe signal on a first strobe line in the first circuit;
    disabling the driver and enabling the termination circuit and the receiver in the first circuit on a first edge of the first strobe signal; and
    latching a plurality of inbound first data signals from a plurality of data lines in a bus in the first circuit on a second edge of the first strobe signal following the first edge of the first strobe signal;

storing the last inbound signal comprises storing last inbound first data signals for the data lines in a register in the first circuit;

driving the last inbound signal on the line comprises driving the last inbound first data signals back on to the data lines;

driving second data on the line comprises:
    driving a second strobe signal on a second strobe line from the first circuit to the second circuit; and
    driving a plurality of second data signals on to the data lines from the first circuit to the second circuit;

disabling a driver and enabling a termination circuit and a receiver in the second circuit comprises disabling a driver and enabling a termination circuit and a receiver in the second circuit on a first edge of the second strobe signal;

receiving the second data comprises latching the second data signals in the second circuit on a second edge of the second strobe signal following the first edge of the second strobe signal; and storing the second data comprises storing last inbound second data signals for the data lines in a register in the second circuit.

11. A circuit comprising:

a termination circuit coupled to a line;

a receiver coupled to the line to receive data from the line;

a storage medium to store the data;

a driver coupled to the line; and a control circuit to:
    enable the termination circuit and the receiver to receive the data;
    store the data in the storage medium;
    disable the termination circuit and the receiver;
    enable the driver; and
    cause the driver to drive the data back on the line immediately after the data has been received.

12. The circuit of claim 11 wherein the control circuit comprises elements or instructions to:
    store last inbound data that is received from the line in the storage medium;
    disable the termination circuit and the receiver;
    enable the driver;
    cause the driver to drive the last inbound data back on the line immediately after the last inbound data is received; and
    cause the driver to drive new data on the line after the last inbound data has been driven back on the line.

13. The circuit of claim 11 wherein the line comprises a plurality of address lines in a bus.

14. The circuit of claim 11 wherein the termination circuit comprises a center-tapped termination circuit coupled to the line and comprising a first impedance device coupled between a supply voltage and the line and a second impedance coupled between a reference voltage and the line, the first and second impedances being switched on when the termination circuit is enabled by the control circuit and being switched off when the termination circuit is disabled by the control circuit.

15. The circuit of claim 11 wherein:

the receiver comprises a buffer circuit coupled to an address line and is enabled by the control circuit;

the driver is enabled by the control circuit;

the storage medium comprises a register; and the termination circuit, the receiver, the storage medium, the driver, and the control circuit are included in a cache memory or a processor.

16. A system comprising:

a first circuit coupled to a line to receive and store first data comprising a series of signals from the line, to drive a last inbound signal from the first data back on to the line immediately after receiving the first data, and then to drive second data comprising a series of signals on to the line; and a second circuit coupled to the line to receive and store the second data from the line, and to drive a last inbound signal from the second data back on to the line immediately after receiving the second data.

17. The system of claim 16 wherein the second circuit is coupled to the line to drive third data on to the line after driving the last inbound signal from the second data back on to the line.

18. The system of claim 16 wherein each of the first and second circuits comprise:
a termination circuit coupled to the line;
a receiver coupled to the line;
a storage medium;
a driver coupled to the line; and
a control circuit.

19. The system of claim 18 wherein the control circuit of the first circuit comprises elements or instructions to:
enable the termination circuit and the receiver of the first circuit to receive the first data from the line;
store the first data in the storage medium of the first circuit;
disable the termination circuit and the receiver and to enable the driver of the first circuit;
cause the driver of the first circuit to drive the last inbound signal from the first data back on to the line immediately after the first data has been received; and
drive the second data on to the line after driving the last inbound signal from the first data back on to the line.

20. The system of claim 19 wherein:
store the first data further comprises store the last inbound signal from the first data in the storage medium of the first circuit; and
cause the driver of the first circuit comprises cause the driver of the first circuit to drive the last inbound signal from the first data back on to the line immediately after the first data has been received.

21. The system of claim 19 wherein the control circuit of the second circuit comprises elements or instructions to:
enable the termination circuit and the receiver of the second circuit to receive the second data;
store the second data in the storage medium of the second circuit;
disable the termination circuit and the receiver and to enable the driver of the second circuit; and
cause the driver of the second circuit to drive the last inbound signal from the second data back on to the line immediately after the second data has been received.

22. The system of claim 21 wherein:
store the second data comprises store the last inbound signal from the second data in the storage medium of the second circuit; and
cause the driver of the second circuit comprises cause the driver of the second circuit to drive the last inbound signal from the second data back on to the line immediately after the second data has been received.

23. The system of claim 21 wherein:
the line comprises a plurality of lines and a strobe line in a bus;
each of the first and second circuits comprise a driver coupled to the strobe line;
the control circuit of the first circuit comprises elements or instructions to drive a first strobe signal on the strobe line having a plurality of edges; and the control circuit in the second circuit comprises elements or instructions to:
enable the termination circuit and the receiver of the second circuit on an edge of the first strobe signal;
latch the second data on an edge of the first strobe signal; and
drive a second strobe signal on the strobe line having a plurality of edges.

24. The system of claim 23 wherein:
the control circuit of the second circuit comprises elements or instructions to cause the driver of the second circuit to drive third data on to the line;
the control circuit of the first circuit comprises elements or instructions to:
enable the termination circuit and the receiver of the first circuit on an edge of the second strobe signal; and
latch the third data on an edge of the second strobe signal.

25. The system of claim 23 wherein:
the control circuit of the second circuit comprises elements or instructions to cause the driver of the second circuit to drive third data on to the line;
the control circuit of the first circuit comprises elements or instructions to:
enable the termination circuit and the receiver of the first circuit on a first edge of the second strobe signal; and
latch the third data on a second edge of the second strobe signal following the first edge.

26. The system of claim 23 wherein:
the lines comprise a plurality of address lines and a strobe line in the bus; and
the first, second, and third data comprise a first, second, and third addresses, respectively.

27. The system of claim 23 wherein the termination circuits in the first and second circuits each comprise a center-tapped termination circuit.

28. The system of claim 23 wherein:
the receivers in each of the first and second circuits comprise a buffer circuit;
the storage mediums in each of the first and second circuits comprise a register;
the first circuit comprises a cache memory; and
the second circuit comprises a processor.

29. A method comprising:
enabling a termination circuit and a receiver coupled to a line;
receiving data from the line in the receiver;
disabling the termination circuit and the receiver;
storing the data in a storage medium;
enabling a driver coupled to the line;
driving the data back on the line from the driver immediately after receiving the data; and
driving new data on the line from the driver after driving the data back on the line.

30. The method of claim 29 wherein:
enabling a termination circuit comprises enabling a plurality of center-tapped termination circuits and a plurality of receivers for a plurality of address lines in a bus, each receiver comprising a buffer;
receiving data comprises receiving a plurality of inbound addresses from the address lines;
storing the data comprises storing a last inbound address in a register as a stored address;

disabling the termination circuit comprises disabling the termination circuits and the receivers;

enabling a driver comprises enabling a plurality of drivers for the address lines in the bus;

driving the data comprises driving the stored address back on the address lines; and driving new data comprises driving a new address on the address lines.

31. A method for operating a system comprising:
receiving first data from a line in a receiver in a first circuit;
storing the first data in a storage medium in the first circuit;
disabling a termination circuit and the receiver in the first circuit and enabling a driver in the first circuit;
driving the first data back on the line from the driver in the first circuit immediately after receiving the first data;
disabling a driver and enabling a termination circuit and a receiver in a second circuit; and
driving second data on the line from the driver in the first circuit to the receiver in the second circuit.

32. The method of claim 31, furtherer comprising:
receiving the second data from the line in the receiver in the second circuit;
storing the second data in a storage medium in the second circuit;
disabling the termination circuit and the receiver in the second circuit and enabling the driver in the second circuit;
driving the second data back on the line from the driver in the second circuit immediately after receiving the second data; and
disabling the driver and enabling the termination circuit and the receiver in the first circuit.

33. The method of claim 32 wherein:
receiving first data comprises:
 disabling the driver and enabling the termination circuit and the receiver in the first circuit; and
 receiving a plurality of inbound first data signals from a plurality of data lines in a bus;
storing the first data comprises storing last inbound first data signals for each data line in a register in the first circuit;
driving the first data back on the line comprises driving the last inbound first data signals back on to each data line;
driving second data on the line comprises:
 driving a strobe signal on a strobe line from the first circuit to the second circuit; and
 driving a plurality of second data signals on to each data line from the first circuit to the second circuit;
receiving the data in the second circuit comprises latching the second data signals in the second circuit on an edge of the strobe signal; and
storing the second data comprises storing last inbound second data signals for each data line in a register in the second circuit.

34. The method of claim 33 wherein:
receiving a plurality of inbound first data signals comprises receiving a plurality of inbound first address signals from a plurality of address lines in a bus;
driving a strobe signal comprises driving a strobe signal on the strobe line having a plurality of edges from a cache memory to a processor; and
disabling a driver and enabling a termination circuit and a receiver in the second circuit comprises disabling the driver and enabling the termination circuit and the receiver in the processor on an edge of the strobe signal before latching the second data signals in the processor.

35. The method of claim 32 wherein:
receiving first data comprises:
 receiving a first strobe signal on a first strobe line in the first circuit;
 disabling the driver and enabling the termination circuit and the receiver in the first circuit on a first edge of the first strobe signal; and
 latching a plurality of inbound first data signals from a plurality of data lines in a bus in the first circuit on a second edge of the first strobe signal following the first edge of the first strobe signal;
storing the first data comprises storing last inbound first data signals for each data line in a register in the first circuit;
driving the first data back on the line comprises driving the last inbound first data signals back on to each data line;
driving second data on the line comprises:
 driving a second strobe signal on a second strobe line from the first circuit to the second circuit; and
 driving a plurality of second data signals on to each data line from the first circuit to the second circuit;
disabling a driver and enabling a termination circuit and a receiver in the second circuit comprises disabling a driver and enabling a termination circuit and a receiver in the second circuit on a first edge of the second strobe signal;
receiving the second data comprises latching the second data signals in the second circuit on a second edge of the second strobe signal following the first edge of the second strobe signal; and
storing the second data comprises storing last inbound second data signals for each data line in a register in the second circuit.

36. A system comprising:
a first circuit coupled to a line to receive and store first data from the line, to drive the first data back on to the line immediately after receiving the first data, and then to drive second data on to the line;
a second circuit coupled to the line to receive and store the second data from the line, to drive the second data back on to the line immediately after receiving the second data, and to drive third data on to the line after driving the second data back on to the line; and
wherein each of the first and second circuits comprise:
 a termination circuit coupled to the line;
 a receiver coupled to the line;
 a storage medium;
 a driver coupled to the line; and
 a control circuit.

37. The system of claim 36 wherein the control circuit of the first circuit comprises elements or instructions to:
enable the termination circuit and the receiver of the first circuit to receive the first data from the line;
store the first data in the storage medium of the first circuit;
disable the termination circuit and the receiver and to enable the driver of the first circuit;
cause the driver of the first circuit to drive the first data back on the line immediately after the first data has been received; and drive second data on the line after driving the first data back on the line.

38. The system of claim 37 wherein:

store the first data comprises store the last inbound first data in the storage medium of the first circuit; and cause the driver of the first circuit comprises cause the driver of the first circuit to drive the last inbound first data back on the line immediately after the first data has been received.

39. The system of claim 37 wherein the control circuit of the second circuit comprises elements or instructions to:

enable the termination circuit and the receiver of the second circuit to receive the second data;

store the second data in the storage medium of the second circuit;

disable the termination circuit and the receiver and to enable the driver of the second circuit; and cause the driver of the second circuit to drive the second data back on the line immediately after the second data has been received.

40. The system of claim 39 wherein:

store the second data comprises store the last inbound second data in the storage medium of the second circuit; and cause the driver of the second circuit comprises cause the driver of the second circuit to drive the last inbound second data back on the line immediately after the second data has been received.

41. The system of claim 39 wherein:

the line comprises a plurality of lines and a strobe line in a bus;

each of the first and second circuits comprise a driver coupled to the strobe line;

the control circuit of the first circuit comprises elements or instructions to drive a first strobe signal on the strobe line having a plurality of edges; and the control circuit in the second circuit comprises elements or instructions to:

enable the termination circuit and the receiver of the second circuit on an edge of the first strobe signal;

latch the second data on an edge of the first strobe signal; and drive a second strobe signal on the strobe line having a plurality of edges.

42. The system of claim 41 wherein:

the control circuit of the second circuit comprises elements or instructions to cause the driver of the second circuit to drive third data on to the line;

the control circuit of the first circuit comprises elements or instructions to:

enable the termination circuit and the receiver of the first circuit on an edge of the second strobe signal; and latch the third data on an edge of the second strobe signal.

43. The system of claim 41 wherein:

the control circuit of the second circuit comprises elements or instructions to cause the driver of the second circuit to drive third data on to the line;

the control circuit of the first circuit comprises elements or instructions to:

enable the termination circuit and the receiver of the first circuit on a first edge of the second strobe signal; and latch the third data on a second edge of the second strobe signal following the first edge.

44. The system of claim 41 wherein:

the lines comprise a plurality of address lines and a strobe line in the bus; and the first, second, and third data comprise a first, second, and third addresses, respectively.

45. The system of claim 41 wherein the termination circuits in the first and second circuits each comprise a center-tapped termination circuit.

46. The system of claim 41 wherein:

the receivers in each of the first and second circuits comprise a buffer circuit;

the storage mediums in each of the first and second circuits comprise a register;

the first circuit comprises a cache memory; and the second circuit comprises a processor.

* * * * *